United States Patent [19]

Karayannis et al.

[11] 4,353,813

[45] * Oct. 12, 1982

[54] CATALYST FOR POLYMERIZATION OF ALPHA-OLEFINS

[75] Inventors: Nicholas M. Karayannis, Naperville; John S. Skryantz, Lisle, both of Ill.

[73] Assignee: Standard Oil Company (Indiana), Chicago, Ill.

[*] Notice: The portion of the term of this patent subsequent to Jul. 14, 1998, has been disclaimed.

[21] Appl. No.: 191,853

[22] Filed: Sep. 29, 1980

[51] Int. Cl.$^3$ .................................................. C08F 4/64
[52] U.S. Cl. .......................... 252/429 B; 252/431 R; 252/431 C; 252/431 N; 252/431 P; 526/124
[58] Field of Search .......... 252/429 B, 431 R, 431 C, 252/431 N, 431 P

[56] References Cited

U.S. PATENT DOCUMENTS

| | | | |
|---|---|---|---|
| 3,094,568 | 6/1963 | Hay et al. | 252/429 B X |
| 3,365,434 | 1/1968 | Coover et al. | 252/429 B X |
| 3,432,513 | 3/1969 | Miller et al. | 252/429 B X |
| 3,549,717 | 12/1970 | Itakura et al. | 252/429 B X |
| 4,069,169 | 1/1978 | Toyoda et al. | 252/429 B |
| 4,146,502 | 3/1979 | Yokoyama et al. | 252/429 B |
| 4,180,636 | 12/1979 | Hirota et al. | 252/429 B X |
| 4,183,824 | 1/1980 | Shiga et al. | 252/429 B |
| 4,242,231 | 12/1980 | Ueno et al. | 252/429 B |
| 4,277,370 | 7/1981 | Karayannis et al. | 252/429 B |

FOREIGN PATENT DOCUMENTS

| | | |
|---|---|---|
| 54-039483 | 3/1979 | Japan . |
| 54-062289 | 5/1979 | Japan . |
| 54-131589 | 10/1979 | Japan . |

*Primary Examiner*—Patrick Garvin
*Attorney, Agent, or Firm*—Stephen L. Hensley; William T. McClain; William H. Magidson

[57] ABSTRACT

Alpha-olefin polymerization catalyst comprising organometallic promoter and component obtained by contacting at least one halogenated aliphatic with solid reaction product of components comprising (1) titanium(IV) halide; (2) organic electron donor; and (3) pretreatment product prepared from components comprising (a) magnesium alcoholate, (b) Group II or IIIA metal alkyl, and optionally, (c) pretreatment modifier.

8 Claims, No Drawings

CATALYST FOR POLYMERIZATION OF ALPHA-OLEFINS

BACKGROUND OF THE INVENTION

This invention relates to the polymerization of alpha-olefins, and more particularly, to an improved, highly active and stereospecific catalyst for polymerization of alpha-olefins.

Our co-pending application Ser. No. 113,543, filed January 21, 1980 now U.S. Pat. No. 4,277,370, discloses highly active and stereospecific catalysts for alpha-olefin polymerization comprising (A) an organoaluminum component and (B) a stereospecific supported component prepared from (1) at least one halogen-containing compound of tetravalent titanium, (2) at least one organic electron donor, and (3) at least one magnesium-containing pretreatment product of components comprising (a) at least one magnesium alcoholate, (b) at least one metal alkyl compound of a metal of Group II or IIIA of the Periodic Table, and optionally, (c) at least one modifier component selected from the group consisting of mineral acids and anhydrides of sulfur, organometallic chalcognide derivatives of hydrogen sulfide, organic acids and organic acid esters. According to a preferred aspect of that application, the reaction product of the aforesaid components (1)–(3) is contacted with liquid Lewis acid to improve activity and stereospecificity.

Despite the desirable performance of the catalysts disclosed in the aforesaid application, improvements in polymerization performance, and particularly activity and/or stereospecificity, would be desirable. It is an object of this invention to provide such improvement. Further objects of the invention are to provide an improved alpha-olefin polymerization catalyst component and catalyst based thereon. Still further objects of the invention are to provide for the preparation of such improved catalyst components and catalysts as well as for the use thereof in the polymerization of alpha-olefins.

We have now found that the objects of this invention can be attained by treatment of the reaction product of the aforesaid components (1)–(3) with certain halogenated aliphatics. Advantageously, the resulting supported catalyst components, on combination with organoaluminum promoter, exhibit polymerization activities and/or stereospecificities at least comparable to those of the preferred catalysts disclosed in application Ser. No. 113,543. In addition, treatment with halogenated aliphatics according to the present invention offers advantages over the Lewis acid treatment of Ser. No. 113,543 in terms of cost and convenience.

Prior art proposals which may be of interest with respect to the present invention include Japanese Patent Publication No. 54-062,289 (Mitsubishi Chemical Ind.), which discloses the use of $CCl_4$, $CHCl_3$ and $CH_2Cl_2$ as halogenating agents in preparation of supported, stereospecific catalyst components. Other materials employed in preparation of the catalyst components are alcohols, Grignard compounds, $TiCl_4$ and electron donors. Various preparative sequences are disclosed, all involving the use of halogenating agent prior to reaction with $TiCl_4$. In contrast, treatment with halogenated aliphatics according to the present invention takes place after reaction with titanium (IV) compound. The catalyst components disclosed in the cited publication also are different from those of the present invention in terms of starting materials and other preparative steps.

It also is known to employ various halogenated organic compounds as solvents in preparation of supported stereospecific catalyst compounds as evidenced by the following:

| | |
|---|---|
| U.S. Pat. No. 4,069,169: (Toyoda et al.) | methyl iodide, ethyl bromide, n-propyl chloride, methylene iodide, carbon tetrachloride, chloroform and chlorobenzene (Column 8 lines 20–25); |
| U.S. Pat. No. 4,146,502: (Yokoyama et al.) | 1,2-dichloroethane, propyl chloride, butyl chloride, chlorobenzene and bromobenzene (Column 5 lines 32–40); |
| U.S. Pat. No. 4,180,636: (Hirota et al.) | methylene chloride, trichloroethane, trichloroethylene and chlorobenzene (Column 11 lines 47–53); |
| Japan 54-039,483: (Mitsubishi Petrochemical Co.) | $C_{1-12}$ halohydrocarbons; |
| Japan 54-131,589: (Mitsubishi Petrochemical Co.) | 1,2-dichloroethane, butyl chloride, bromobenzene. |

However, the foregoing do not suggest treatment of supported catalyst components with halogenated aliphatics to improve polymerization performance. Further, none of the foregoing suggests the use of halogenated aliphatics in conjunction with the specific supported catalyst components employed according to this invention.

It also is known that halogenated aliphatics such as carbon tetrachloride can be employed in preparation of organoaluminum-reduced, electron donor complexed, unsupported titanium trichloride catalyst components. Thus, for example, U.S. Pat. No. 4,183,824 (Shiga et al.) discloses preparation of titanium trichloride-based catalyst components by reduction of titanium tetrachloride with an organoaluminum component followed by complexing the first step product with an ether, treatment of the resulting complex with certain organoaluminum halides in the presence of a halogenated organic compound, and treatment of the result with ether in combination with certain tertiary carbon-containing compounds and/or certain organosulfur compounds. Of course, the supported catalyst components of the present invention differ substantially from unsupported $TiCl_3$ components such as those of Shiga et al. in terms of composition, manner of preparation and polymerization performance.

DESCRIPTION OF THE INVENTION

Briefly, the unimproved stereospecific supported catalyst component employed according to this invention comprises the solid reaction product of components comprising (1) at least one titanium (IV) halide; (2) at least one organic electron donor; and (3) at least one hydrocarbon-insoluble, magnesium-containing pretreatment product of components comprising (a) at least one magnesium alcoholate, (b) at least one Group II or IIIA metal alkyl, and optionally, (c) at least one pretreatment modifier selected from the group consisting of mineral acids and anhydrides of sulfur, organometallic chalcogenide derivatives of hydrogen sulfide, organic acids and organic acid esters. For purposes hereof, "pretreatment product" is defined as a product which is essentially free of incompletely reacted Group II or IIIA metal alkyl. According to the present invention, such components are treated with at least one liquid halogenated aliphatic to improve polymerization performance.

In somewhat greater detail, the aforesaid magnesium-containing pretreatment product, (3), is obtained by contacting components comprising (a) at least one magnesium alcoholate of the formula $Mg(OR^1)_n(OR^2)_{2-n}$ wherein $R^1$ and $R^2$ are identical or different hydrocarbyl radicals of 1 to about 20 carbon atoms and n ranges from 0 to 2; and (b) at least one Group II or IIIA metal alkyl containing 1 to about 20 carbon atoms per alkyl radical. Preferably, to maximize activity, the pretreatment components further comprise (c) at least one modifier selected from the group consisting of mineral acids and anhydrides of sulfur, organometallic chalcogenide derivatives of hydrogen sulfide, organic acids and esters thereof.

Specific examples of useful magnesium alcoholates include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, and $Mg(OC_{16}H_{33})(OC_{18}H_{37})$. Mixtures of magnesium alcoholates also can be employed if desired. Additionally, although not preferred, mixtures of magnesium alcoholates with minor amounts of other suitable metal salts such as alcoholates of lanthanum and the lanthanide metals, magnesium halides, hydroxyhalides, carboxylates, and so forth can be used.

From the standpoint of cost and availability, magnesium alcoholates which are preferred are those of the formula $Mg(OR^1)_2$ wherein $R^1$ is as defined above. In terms of catalytic activity and stereospecificity, best results are achieved through the use of magnesium alcoholates of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms. Best results are attained with magnesium ethoxide.

Useful Group II and IIIA metal alkyls are compounds of the formula $MR^3_m$ wherein M is a Group II or IIIA metal, each $R^3$ is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, $R^3$, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a hydrocarbon-soluble magnesium, zinc, or aluminum alkyl containing 1 to about 6 carbon atoms per alkyl radical is used. Best results are achieved with the trialkylaluminums containing 1 to about 6 carbon atoms per alkyl radical, and particularly triethylaluminum.

Modifiers useful as pretreatment components are mineral acids and anhydrides of sulfur, organometallic chalcogenide derivatives of hydrogen sulfide, organic acids, organic acid esters, and mixtures thereof.

Specific examples of useful mineral acids and anhydrides of sulfur include sulfur dioxide, sulfur trioxide, sulfuric acid, fuming sulfuric acid, and halosulfonic acids such as chlorosulfonic and fluorosulfonic acids. Hydrogen sulfide, which behaves as a weak acid in aqueous solution, also is considered a mineral acid of sulfur for purposes hereof. Also contemplated are the organometallic chalcogenide derivatives of hydrogen sulfide in which each hydrogen is replaced by an organosilicon, organogermanium, or organotin group wherein the organic radicals are selected from the group consisting of phenyl, alkylsubstituted phenyl, phenyl-substituted alkyl, and alkyl radicals, such alkyl radicals containing 1 to about 6 carbon atoms. Specific examples of useful organometallic chalcogenide pretreatment modifiers include bis(triphenyltin)sulfide, bis(tritolyltin)sulfide, bis(triethylphenyltin)sulfide, bis(trihexylphenyltin)sulfide, bis(triphenylmethyltin)sulfide, bis(triphenylethyltin)sulfide, bis(triphenylhexyltin)sulfide, bis(trimethyltin)sulfide, bis(triethyltin)sulfide, bis(tributyltin)sulfide, bis(trihexyltin)sulfide, and similar silicon- and germanium-containing compounds.

Among the mineral acids and anhydrides of sulfur and organometallic chalcogenide derivatives, sulfuric acid, fuming sulfuric acid, chlorosulfonic acid, and hydrogen sulfide are preferred because they lead to the best overall improvements in activities and stereospecificities.

Organic acids useful as pretreatment components are acids containing from 1 to about 20 carbon atoms and 1 to about 4 carboxyl groups. Such acids include aliphatic acids of 1 to about 20 carbon atoms; halogen-, hydroxyl-, oxy-, alkyl-, alkoxy-, aryl-, and/or aryloxysubstituted aliphatic acids of 1 to about 20 carbon atoms; aromatic acids of 7 to about 14 carbon atoms; and halogen-, hydroxyl-, oxy-, alkyl-, alkoxy-, aryl-, and/or aryloxy-substituted aromatic acids of 7 to about 20 carbon atoms. Monocarboxylic acids are preferred over the polycarboxylic acids.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acid, veratric acid, asaronic acid, ethoxybenzoic acids, piperonylic acids, vanillic acid, cresotic acid, and everninic acid.

Organic acid esters useful as pretreatment components include alkyl and haloalkyl esters of acids such as are described above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chlorethyl, bromoethyl, butyl, hexyl, cyclohexyl, octyl, chlorododecyl, phenyl, chlorophenyl, and naphthyl esters of acids such as are named above.

Preferred organic acids and esters are benzoic acid, halobenzoic acids and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use.

Mixtures of pretreatment modifiers which are preferred are combinations of at least one of the above-described mineral acids or anhydrides of sulfur or organometallic chalcogenide derivatives with at least one of the above-described organic acids or organic acid esters. More preferred combinations are those containing at least one of the preferred sulfur-containing modifiers identified above (i.e., sulfuric acid, fuming sulfuric acid, chlorosulfonic acid, and hydrogen sulfide) and at least one of the preferred organic acids and esters identified above (i.e., benzoic acid, halogenzoic acids, and the $C_1$ to about $C_6$ alkyl esters thereof). Best results are attained through the use of a combination of chlorosulfuric acid and methyl benzoate.

The magnesium-containing pretreatment product employed in preparation of the unimproved catalyst component is obtained by contacting components comprising at least one magnesium alcoholate and at least one Group II or IIIA metal alkyl. Preferably, at least one of the above-described pretreatment modifiers also is employed. The components are employed in amounts such that the atomic ratio of metal in the Group II or IIIA metal alkyl component to metal in the magnesium alcoholate component ranges from about 0.001:1 to about 1:1. Preferably, this ratio ranges from about 0.005:1 to about 0.5:1 as these amounts provide for desirable catalyst performance without hindering removal of unreacted Group II or IIIA metal alkyl from the reaction product that ultimately forms. In a preferred embodiment, wherein at least one pretreatment modifier is employed in preparation of the pretreatment product, the modifier is employed in an amount which is effective to improve catalyst component performance but not so great as to hinder pretreatment due to formation of excessive amounts of solids on reaction with the Group II or IIIA metal alkyl pretreatment component. Preferably, this amount ranges from about 0.001 to about 2 moles of pretreatment modifier per mole of Group II or IIIA metal alkyl component. Best results are attained when the molar ratio of pretreatment modifier to metal alkyl component ranges from about 0.005:1 to about 1:1, and particularly from about 0.1:1 to about 0.5:1. According to a particularly preferred embodiment wherein the modifier component employed is a mixture of at least one mineral acid or anhydride of sulfur or organometallic chalcogenide derivative and at least one organic acid or ester, it is preferred to employ from about 0.5 to about 20 moles of the organic acid or ester per mole of sulfur-containing modifier. More preferably, this ratio ranges from about 1:1 to about 15:1.

As indicated above, the pretreatment product is free of unreacted Group II or IIIA metal alkyl and is prepared by contacting the pretreatment components. Although not required, it is preferred to contact the components in the presence of an inert diluent to aid in conductance of heat evolved on reaction of the magnesium alcoholate and metal alkyl components away from the reaction product, and further, because in the absence of a diluent the magnesium alcoholate and metal alkyl components typically react to form a sticky mass which can be difficult to handle in subsequent preparative manipulations. Although it is preferred to contact the pretreatment components in the presence of an inert diluent, other techniques such as pulverization of magnesium alcoholate in the presence of metal alkyl and, optionally, modifier component or a fluidized bed treatment of solid magnesium alcoholate with a solution of Group II or IIIA metal alkyl, and optionally, one or more modifiers, also can be employed. Most preferably, Group II or IIIA metal alkyl in the form of a solution in an inert diluent is added to a suspension of magnesium alcoholate in a diluent. Modifier components, when used, can be employed in any convenient form.

Diluents suitable for use in pretreatment include hydrocarbons and halogenated derivatives thereof that are substantially inert to the pretreatment components employed and, preferably, are liquid at pretreatment temperatures; although it also is contemplated to conduct the pretreatment at elevated pressure so that lowerboiling diluents can be used even at higher temperatures. Examples of useful diluents include alkanes such as hexane, cyclohexane, ethylcyclohexane, heptane, octane, nonane, decane, undecane, and so forth; aromatics such as xylenes and ethylbenzene; and halogenated and hydrogenated aromatics such as chlorobenzene, o-dichlorobenzene, tetrahydronaphthalene, and decahydronaphthalene. Preferred diluents are the alkanes and especially hexane.

The sequence in which the pretreatment components are contacted is not critical. When pretreatment is carried out without the use of pretreatment modifier, the magnesium alcoholate and Group II or IIIA metal alkyl components are simply combined. When one or more modifier components are employed, magnesium alcoholate component, Group II or IIIA metal alkyl component, and modifier component can be contacted concurrently or two of the components can be brought together and then the third component added to the result. Best results are attained when the modifier component is added to a solution of Group II or IIIA metal alkyl component in a diluent and then the resulting solution is added to the magnesium alcoholate component.

Pretreatment is carried out at temperatures ranging from about −30° to about 130° C. Preferably, the pretreatment temperature ranges from about 0° to about 60° C., with about 10° to about 30° C. being more preferred from the standpoint of convenience. The time of pretreatment generally ranges from several minutes to several hours, with about 1 to about 10 hours being preferred. It is desirable to agitate the components during at least a substantial portion of the pretreatment period to ensure thorough contacting of the components.

Following contacting of pretreatment components as described above, unreacted Group II or IIIA metal alkyl component is removed from the reaction product of the pretreatment components to avoid reduction of the titanium component employed in subsequent preparative steps. When pretreatment is conducted in the presence of an inert diluent, the reaction product preferably is separated from the diluent, for example by filtration or decantation, and unreacted Group II or IIIA metal alkyl is removed therefrom by washing with hexane or another suitable solvent.

The above-described pretreatment is conducted in the substantial absence of water, oxygen, carbon oxides, and other extraneous materials capable of adversely affecting polymerization performance of the ultimate catalyst component. Such materials are conveniently excluded by carrying out the pretreatment in the presence of an inert gas such as nitrogen or argon, or by other suitable means. It also is contemplated to conduct all or part of the pretreatment in the presence of one or more alpha-olefins which, when introduced into the preparative system in gaseous form, can serve to exclude catalyst poisons. The presence of one or more alpha-olefins during pretreatment also can result in improved stereospecificity. Useful alpha-olefins include ethylene, propylene, butene-1, pentene-1, 4-methylpentene-1, hexene-1, and mixtures thereof. Of course, any alpha-olefin employed during pretreatment should be of relatively high purity, for example, polymerization grade or higher. Other precautions which aid in excluding extraneous poisons include purification of any diluent to be employed, such as by percolation through molecular sieves and/or silica gel prior to use, and drying and/or heating of magnesium alcoholate pretreatment components.

As a result of pretreatment, there is obtained a hydrocarbon-insoluble, magnesium-containing pretreatment product which can be reacted with at least one titanium-(IV) halide and at least one organic electron donor to form a stereospecific supported catalyst component useful in alpha-olefin polymerization, and particularly in the stereospecific polymerization of alpha-olefins of 3 or more carbon atoms.

Useful titanium(IV) halides include titanium tetrahalides and tetra(haloalcoholates) having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired.

Preferred titanium compounds are the tetrahalides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, and particularly $TiCl_4$, are most preferred from the standpoint of attaining maximum activity and stereospecifity.

Organic electron donors useful in preparation of the unimproved catalyst components of this invention are organic compounds containing oxygen, nitrogen, sulfur, and/or phosphorus. Such compounds include organic acids, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as pretreatment modifiers as described above, alphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetole, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alphatolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and diphenyl ketone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, tetraethylputrescine, diphenylmethylamine, triphenylamine, tritolylamine, diphenylbenzylamine, triphenylethylamine, triethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such as methanethiol, ethanethiol, ethanedithiol, propanethiols, butanethiols, butanedithiols, hexanethiols, and the like; thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine; thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, triethyl trithiophosphite, hexamethylphosphoric triamide, and the like; and phosphine oxides such as triethylphosphine oxide, triphenylphosphine oxide, and the like.

From the standpoint of catalyst performance and preparative ease, organic electron donors which are preferred are the $C_1$-$C_6$ alkyl esters of aromatic monocarboxylic acids and halogen-, hydroxyl-, oxy-, alkyl, alkoxy-, aryl-, and/or aryloxy-substituted aromatic monocarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate are particularly preferred. Best results are attained with ethyl benzoate.

In preparation of the unimproved supported catalyst components, the magnesium-containing pretreatment product, titanium(IV) halide, and organic electron donor component are contacted in amounts such that the atomic ratio of titanium to metal in the magnesium alcoholate component employed in pretreatment is at least about 0.5:1. Preferably, this ratio ranges from about 0.5:1 to about 20:1. A greater proportion of titanium can be employed without adversely affecting catalyst component performance, but there typically is no need to exceed a titanium to magnesium ratio of about 20:1 as only a portion of the titanium is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

The sequence in which the component are contacted is not critical. Suitably, pretreatment product, titanium(IV) component, and electron donor component are contacted concurrently or two of the components are contacted followed by addition of the remaining component. From the standpoint of catalyst performance and preparative ease, the preferred preparative sequence is to combine the pretreatment product and titanium(IV) halide and then add the organic electron donor component to the result.

The pretreatment product, titanium(IV), and electron donor components preferably are contacted in the presence of an inert hydrocarbon or halogenated hydrocarbon diluent, although other suitable techniques can be employed. Suitable diluents are materials which are substantially inert to the components employed and are liquid at the temperatures employed or can be maintained in the liquid state through the use of elevated pressure. As in the case of the diluents employed in pretreatment, it is desirable to purify any diluent to be employed to remove water, oxygen, carbon oxides, and other extraneous catalyst poisons. Examples of suitable diluents include materials such as are identified above as suitable pretreatment diluents, with nonane being preferred.

Reaction between the pretreatment product, titanium component, and organic electron donor is carried out at temperatures ranging from about 50° to about 170° C. Best results are attained at about 130° to about 160° C. Generally the reaction is carried out over a period of several minutes to several hours, with about ¼ to about 10 hours giving good results at desirable rates. Most preferably, the reaction time ranges from about 1 to about 5 hours. When the components employed in preparation are contacted according to the preferred preparative sequence, best results are attained when the pretreatment product and titanium(IV) component are combined at about ambient temperature followed by addition of electron donor, at about ambient temperature and with agitation, over about ¼ to about 1½ hours and then heating at about 130° to about 160° C. for about ½ to about 3 hours with continued agitation.

Due to the sensitivity of the unimproved catalyst component to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin as described hereinabove. As noted above, purification of any diluent to be employed also aids in removing poisons from the preparative system.

As a result of the above-described steps there is obtained a solid reaction product which, according to the present invention, is treated with at least one halogenated aliphatic compound in an amount and under conditions effective to improve the polymerization performance of the reaction product.

Halogenated aliphatics useful according to this invention are materials that remain or can be maintained in the liquid state at treatment temperatures and have a sufficiently high halogen content to exhibit only insubstantial reactivity towards the above-described solid reaction product. Specific examples of such materials include dichloromethane, bromochloromethane, chloroiodomethane, chloroform, bromodichloromethane, carbon tetrachloride, 1,2-dichloroethane, 1,1-dibromoethane, 1,2-dibromo-1,2-dichloroethane, tetrachloroethylene, 1,2-difluoro-1,1,2,2-tetrachloroethane, 1,1,3-trichloropropane, 1,1,1,2-tetrachloropropane and 1,4-dichloro-2-butene. Mixtures can be used if desired. Preferred halogenated aliphatics are those in which the halogen is the same as that in the titanium(IV) halide employed in preparation of the unimproved component. More preferably, a halogenated methane, ethane or ethylene that remains in the liquid state at temperatures ranging from about 0° to about 160° C. and contains halogen corresponding to that of the titanium(IV) halide is used. As the preferred titanium(IV) halides are the chlorides, the most preferred halogenated aliphatics are the chlorinated methanes, ethanes and ethylenes, best results are attained with carbon tetrachloride.

Prior to contacting with halogenated aliphatic it is contemplated to wash the above-described solid reaction product with inert liquid hydrocarbon or halogenated aromatic hydrocarbon although this is not required. Suitable inert liquids include those identified hereinabove as pretreatment and preparative diluents. If such a wash is conducted it is preferred to substantially remove the inert liquid prior to contacting the washed solid with halogenated aliphatic.

The halogenated aliphatic employed according to the invention preferably is used neat although it also is contemplated to employ the same diluted with up to about 40 vol.% of an inert solvent therefor. Suitable solvents include those materials useful as diluents in preparation of pretreatment product and supported catalyst component as described hereinabove. Of course, any such solvent should be purified prior to use. The amount of halogenated aliphatic used, whether neat or diluted, is not critical. From a practical standpoint, however, the amount should be great enough to provide a high degree of contact between the solid and liquid but not so great as to waste the material or require excessively large vessels for the contacting. Most preferably, from about 3 to about 10 ml. halogenated aliphatic are used for each gram of solid to be treated.

Temperature in the halogenated aliphatic-contacting step is high enough to avoid solidification of the halogenated aliphatic but not so high as to damage the catalyst component or adversely affect ultimate catalyst performance. Preferred temperatures range from about 0° to about 160° C. with about 20 to about 100° C. being more preferred.

The time of contact with the halogenated aliphatic is not critical and generally ranges from several minutes to several hours. It is desirable to agitate the solid and halogenated aliphatic during at least a substantial portion of this time to ensure a high degree of contact. Preferred contact times range from 1 to about 30 minutes as the same yield the desired improvements without occupying preparation equipment for undesirably lengthy periods of time.

As in preparation of the solid reaction product, the halogenated aliphatic-contacting step according to this invention is conducted in the substantial absence of oxygen, water, carbon oxides and extraneous catalyst poisons. Such materials are excluded by any convenient manner as described hereinabove.

Following contacting with halogenated aliphatic, solids are allowed to settle and supernatant is removed such as by filtration or decantation. One or more additional halogenated aliphatic-contacting steps can be carried out with the same or different halogenated aliphatic. In addition, various combinations of halogenated aliphatic, inert hydrocarbon and/or liquid Lewis acid treatments can be conducted if desired.

Prior to use in the polymerization of alpha-olefins, it is desirable to mechanically activate the invented catalyst components. Mechanical activation improves the polymerization performance of the invented catalyst components in terms of both activity and susceptibility to modification by crystallinity promoting modifiers. The preferred technique for mechanically activating the invented catalyst components is dry ball-milling, that is, ball-milling in the absence of inert diluent. However, good results also can be attained by ball-milling in the presence of a minor amount of an inert diluent such as hexane, as well as by other techniques. It also is contemplated to mechanically activate the invented catalyst components in the presence of one or more organic electron donors of the general type employed in preparation of the catalyst components. Optimum mechanical activation techniques and conditions can be determined by persons of skill in the art on the basis of the examples appearing hereinafter.

Optimum polymerization performance is attained by treating with halogenated aliphatic and then mechanically activating. Treatment of mechanically activated catalyst component with halogenated aliphatic is not preferred as it may result in agglomeration of the component and inferior polymerization performance.

Although the chemical structure of the invented catalyst components is not presently known, the components preferably contain from about 1 to about 5 wt.% titanium, from about 10 to about 25 wt.% magnesium, less than about 1 wt.% Group II or IIIA metal and from about 45 to about 65 wt.% halogen. From the standpoint of attaining maximum efficiency of titanium, catalyst components which are more preferred according to this invention contain from about 1.5 to about 3 wt.% titanium, from about 15 to about 20 wt.% magnesium, less than about 0.5 wt.% Group II or IIIA metal, and from about 50 to about 60 wt.% chlorine. The mechanism by which the halogenated aliphatic treatment improves component performance also is unknown although it appears to result in removal of poorly affixed compounds from the surface of the component.

The catalysts of this invention comprise a stereospecific supported component as described above and at least one organoaluminum activator. Preferably, the invented catalysts further comprise one or more crystallinity promoters. Suitable organoaluminum activators include trihydrocarbylaluminum compounds and dihydrocarbylaluminum hydrides having 1 to about 20 carbon atoms per hydrocarbyl radical. Specific examples of useful organoaluminum compounds include $Al(CH_3)_3$, $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$, $Al(C_{12}H_{25})_3$, $Al(CH_3)_2H$, $Al(C_2H_5)_2H$, $Al(C_3H_7)_2H$, $Al(C_4H_9)_2H$, $Al(C_5H_{11})_2H$, $Al(C_6H_{13})_2H$, $Al(C_8H_{17})_2H$, and $Al(C_{12}H_{25})_2H$. Mixtures also can be employed if desired as can mixtures with alkylaluminum halides. Preferred organoaluminum compounds are the trialkylaluminums containing 2 to about 6 carbon atoms per alkyl radical as these leads to best results in terms of activity and stereospecifity. Most preferably, the organoaluminum activator is triethylaluminum, triisobutylaluminum or a mixture thereof. The activator is employed in at least an amount that is effective to promote the polymerization activity of the supported component. Preferably the molar ratio of activator to titanium in the supported component is at least about 3:1. More preferably, this ratio ranges from about 5:1 to about 300:1, although substantially greater amounts of organoaluminum component also can be employed and often gives highly desirable results.

Useful crystallinity promoters are materials that further improve the stereospecificity of the invented catalysts and include a wide variety of materials and combinations of materials. Examples of useful materials include a variety of organic electron donors, such as those employed in preparation of the invented, stereospecific supported catalyst components, and various inorganic mineral acids, anhydrides, and derivatives, including those employed in pretreatment as described hereinabove. The particular materials or combination to be employed can be readily determined by persons of skill in the art and the examples appearing hereinafter illustrate the use of various crystallinity promoters. Preferred materials are those capable of improving stereospecificity without leading to substantial decreases in activity. Examples of preferred crystallinity promoters include ethyl benzoate, ethyl-p-anisate, methyl p-toluate, ethyl pivalate, 2,2,6,6-tetramethylpiperidine, 2-benzylpyridine, 2-acetylpyridine, and combinations thereof.

The above-described catalysts are useful in the polymerization of alpha-olefins and preferably in the stereospecific polymerization of alpha-olefins of 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry, bulk, and vapor phase polymerization processes are contemplated herein.

The amount of catalyst to be employed varies depending on choice of polymerization technique, reactor capacity, production rate, and other factors known to persons of skill in the art, and can be determined on the basis of the examples appearing hereinafter.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure, at the polymerization temperature, of the alpha-olefin to be polymerized.

The polymerization time is not critical and will generally range from about ½ to several hours in batch processes. Polymerization times ranging from about 1 to about 4 hours are typical in autoclave type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well known diluents. It often is desirable to purify the polymerization medium prior to use such as by distillation, percolation through molecular sieves, contacting with a compound such as an alkylaluminum compound capable of removing trace impurities, or by other suitable means.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Upon completion of polymerization, or when it is desired to terminate polymerization or deactivate the catalysts of this invention, the catalysts can be contacted with water, alcohols, acetone, or other suitable catalyst deactivators in a manner known to persons of skill in the art.

The products produced in accordance with the polymerization process of this invention are normally solid, predominantly crystalline polyalpha-olefins containing low levels of alkane soluble products. Polymer yields are sufficiently high, relative to the amount of catalyst employed, that useful products can be obtained without separation of catalyst residues. Further, levels of stereorandom by-products are sufficiently low that useful products can be obtained without separation thereof. The polymeric products produced in the presence of the invented catalysts can be fabricated into useful articles by extrusion, injection molding, and other common techniques.

The following examples illustrate the present invention and are not to be construed as limiting the scope thereof.

EXAMPLE 1

(A) Preparation of Pretreatment Product

Into a 1 liter flask equipped with magnetic stirrer and maintained under nitrogen in a drybox were added 100 ml n-hexane and 11.4 g anhydrous magnesium ethoxide. The resulting suspension was stirred and 20 ml of a mixture prepared by combining 60 ml 25 wt.% triethylaluminum (TEA) in n-hexane, 0.03 ml chlorosulfonic acid (CSA) and 0.2 ml methylbenzoate (MB) were added dropwise to the stirred suspension over a period of about ¼ hour at ambient temperature. Stirring was continued for 1 hour following completion of the addition of the TEA-CSA-MB solution and then the solid reaction product was allowed to settle. Supernatant then was decanted and the solid was washed twice with 125 ml portions of dry n-hexane. The resulting pretreatment product then was suspended in 450 ml n-nonane. The atomic ratio of aluminum to magnesium employed in preparation of the pretreatment product was 0.3:1.

(B) Preparation of Supported Catalyst Component

Into a 1 liter flask equipped as in (A) were added the suspension of pretreatment product prepared in (A) and 100 ml titanium tetrachloride. To the resulting mixture there were added dropwise a solution of 2.5 ml ethyl benzoate in 50 ml n-nonane over a period of about ¼ hour at ambient temperature and with stirring. After addition of the ethyl benzoate solution was completed the resulting mixture was heated to 135°–140° C., stirred at that temperature for 1½ hours, and then allowed to cool to about 115° to 120° C. The supernatant liquid then was decanted.

(C) Halogenated Organic Treatment

In a 1 liter flask equipped with mechanical stirrer and under nitrogen were added the solid from (B) and 65 ml carbon tetrachloride. The resulting mixture was heated to 76° C. and stirred for 5 minutes. Supernatant then was decanted and the resulting solid was washed four times with 150 ml portions of n-hexane.

(D) Mechanical Activation of Supported Catalyst Component

The solid catalyst component prepared in (C) and 90 stainless steel balls having a diameter of 10 mm were placed in a Roalox, burundum-fortified porcelain mill jar (manufactured by A. Daigger Company) having a capacity of ¼ quart (about 280 ml) and milled in a rotary ball mill (manufactured by Paul O. Abbe, Inc., motor speed=1725 rpm) for 25 hours at ambient temperature under an atmosphere of dry nitrogen. The solid then was removed from the mill jar, separated from the steel balls, and suspended in 200 ml hexane. Aliquots of the suspension were employed in the polymerization of propylene as described in (E).

The atomic ratio of titanium employed in (B) to magnesium employed in (A) was 9.2:1 and the ratio of ethyl benzoate to titanium was 0.02 mole per gram-atom.

(E) Propylene Polymerization

A series of propylene polymerizations were conducted using aliquots of 1(D) according to the following procedure. Amounts of catalyst component suspension (containing 0.050 g supported catalyst component), TEA (0.15 ml 25 wt.% in hexane unless otherwise indicated), and in most runs, various crystallinity promoters (CP) were added to 200 ml n-hexane in a 450 ml pressure bottle equipped with magnetic stirrer after which the bottle was sealed and placed in a 60° C. oil bath. Polymerization grade propylene then was charged to the bottle at 50 psig. (about 3.52 kg/cm²) and the contents of the bottle were stirred. After 1 hour, the bottle was cooled, opened, and the contents filtered. The resulting white solid polypropylene was dried at ambient temperature and weighed. Solubles ("SOL") were determined by evaporation of the filtrate to dryness and weighing of the residue. Extractables ("EXT") were determined by Soxhlet extraction of a weighed sample of the solid polypropylene with boiling n-hexane. Results are reported in TABLE 1.

TABLE 1

| RUN NO. | CP[1] (ml) | ACTIVITY (g/g/hour) | SOL (wt. %) | EXT (wt. %) |
|---|---|---|---|---|
| 1[2] | None | 1504 | 12.3 | 5.6 |
| 2 | 0.006 EB + 0.003 EA | 647 | 0.8 | 1.9 |
| 3 | 0.006 EB + 0.003 EP | 517 | 0.9 | 1.8 |
| 4 | 0.006 EB + 0.003 TMP | 945 | 1.0 | 2.3 |
| 5 | 0.006 EB + 0.003 EBB | 327 | 0.5 | 1.4 |
| 6 | 0.006 EB + 0.003 AP | 798 | 1.1 | 2.0 |

[1]Crystallinity Promoters are abbreviated as follows: EB-ethyl benzoate, EA-ethyl p-anisate, EP-ethyl pivalate, TMP-2,2,6,6-tetramethylpiperidine, EBB-ethyl p-bromobenzoate, AP-2-acetylpyridine.
[2]0.10 ml TEA solution was used in this run.

The improved performance resulting from treatment according to this invention can be seen by comparison of Example 1 and Table 1 with Examples 8 and 23 and Tables 6 and 13 of application Ser. No. 113,543. In all three examples the basic preparation was substantially identical, the only difference being the manner in which the pretreatment product-TiCl$_4$-ethyl benzoate reaction product was treated prior to milling. In Example 8 there was no treatment. Example 23 involved a TiCl$_4$ treatment. Example 1 herein involved a CCl$_4$ treatment. As can be seen by comparison of polymerization results in runs with the same crystallinity promoters, the CCl$_4$-treated catalyst component was generally comparable or better in terms of activity and stereospecificity than the untreated and TiCl$_4$-treated components. A similar conclusion in applicable with respect to comparison of the invented catalyst components to the SiCl$_4$-treated components of Example 27 and Table 17 of Ser. No. 113,543.

EXAMPLE 2

Samples of the suspension from EXAMPLE 1(D) containing 0.021 g catalyst component were employed in bulk phase polymerization of propylene according to the following procedure. Catalyst component samples and sufficient TEA solution, ethyl benzoate (EB) and ethyl p-anisate (EA) or 2,2,6,6-tetramethylpiperidine (TMP) to give the molar ratios shown in TABLE 2 were mixed under nitrogen in a drybox and then flushed in 300 cc propylene into a 2 liter Parr reactor charged to 10 psig with hydrogen and heated to 60° C. Another 1000 cc. propylene were charged to the reactor and polymerization was conducted for 2 hours (unless otherwise indicated). Polymerization was terminated by cooling, venting, and opening the reactor. After drying in an oven, the resulting solid polypropylene was weighed, extractables (EXT) were determined as in EXAMPLE 1, and product bulk density (BD) was determined by weighing a polymer sample of known volume. Results are reported in TABLE 2.

TABLE 2

| RUN NO. | MOLAR RATIO | ACTIVITY (g/g/hour) | EXT (wt. %) | MFR (dg/min.) | BD (#/ft³) |
|---|---|---|---|---|---|
| | TEA/Ti/EB/EA | | | | |
| 1 | 50/1/3/4.2 | 2804 | 5.6 | 2.4 | 25.1 |
| 2 | 50/1/3/4.2 | 5662 | 8.3 | 3.8 | 25.1 |
| | TEA/Ti/EB/TMP | | | | |
| 3 | 50/1/3/4.2 | 10921 | 13.9 | 10.6 | 23.0 |
| 4 | 50/1/3.7/4.7 | 7429 | 9.3 | 4.8 | 25.7 |
| 5 | 50/1/3.7/4.7 | 10497 | 13.1 | 12.5 | 23.7 |
| 6 | 50/1/4.6/4.7 | 8478 | 10.0 | 7.6 | 23.7 |
| 7 | 50/1/4.6/4.7 | 9439 | 12.6 | 9.6 | 22.0 |
| 8 | 50/1/5.5/4.7 | 8212 | 10.2 | 7.1 | 23.7 |
| 9 | 50/1/5.5/4.7 | 7095 | 10.7 | 10.1 | 24.3 |

TABLE 2-continued

| RUN NO. | MOLAR RATIO | ACTIVITY (g/g/hour) | EXT (wt. %) | MFR (dg/min.) | BD (#/ft³) |
|---|---|---|---|---|---|
| 10 | 50/1/9.2/4.7 | 3714 | 6.4 | 5.8 | 24.9 |
| 11 | 50/1/9.2/4.7 | 4009 | 7.3 | 6.3 | 24.4 |
| 12 | 50/1/9.2/6.2 | 4138 | 6.3 | 5.5 | 25.1 |
| 13 | 50/1/9.2/6.2 | 3907 | 6.7 | 5.5 | 24.2 |
| 14 | 50/1/9.2/7.8 | 3701 | 6.8 | 5.8 | 25.7 |
| 15 | 50/1/9.2/7.8 | 4414 | 5.2 | 0.3 | 23.4 |

On the basis of titanium content of the polypropylene produced in runs 1–15, activities ranged from about 150,000 to above 500,000 g/g Ti/hr.

We claim:

1. An alpha-olefin polymerization catalyst component obtained by contacting, in the substantial absence of oxygen, water, carbon oxides and other extraneous catalyst poisons, components comprising (A) at least one liquid, halogenated aliphatic having a sufficiently high halogen content to exhibit only insubstantial reactivity with (B); and (B) a solid reaction product of components comprising:
   (1) at least one titanium(IV) halide;
   (2) at least one organic electron donor which contains oxygen, nitrogen, sulfur and/or phosphorus; and
   (3) at least one hydrocarbon-insoluble, magnesium-containing pretreatment product of components comprising
      (a) at least one magnesium alcoholate; and
      (b) at least one Group II or IIIA metal alkyl;
wherein the atomic ratio of metal in (3)(b) to metal in (3)(a) ranges from about 0.001:1 to about 1:1, the atomic ratio of titanium in (1) to metal in (3)(a) is at least about 0.5:1, and (2) is employed in an amount ranging from about 0.001 to about 1 mole per gram-atom of titanium contained in (1).

2. The catalyst component of claim 1 wherein the components in (3) comprise, in addition to components (a) and (b), a component (c) which is at least one pretreatment modifier selected from the group consisting of mineral acids and anhydrides of sulfur, organometallic chalcogenide derivatives of hydrogen sulfide in which each hydrogen is replaced by an organosilicon, organogermanium, or organotin group wherein the organic radicals are selected from the group consisting of phenyl, alkyl-substituted phenyl, phenyl-substituted alkyl, and alkyl radicals, such alkyl radicals containing 1 to about 6 carbon atoms, organic acids containing from 1 to about 20 carbon atoms and 1 to about 4 carboxyl groups and alkyl and haloalkyl esters of such acids containing 1 to about 12 carbon atoms per alkyl group and aryl and haloaryl esters of such acids containing 6 to about 10 carbon atoms per aryl group.

3. The catalyst component of claim 2 wherein the halogenated aliphatic comprises at least one halogenated methane, ethane or ethylene in the liquid state at temperatures ranging from about 0° to about 160° C. and in which the halogen is the same as that in said titanium(IV) halide.

4. The catalyst component of claim 3 further characterized in that said component is dry ball-milled.

5. The catalyst component of claim 2 wherein the halogenated aliphatic comprises carbon tetrachloride.

6. The catalyst component of claim 1 further characterized in that said component is mechanically activated.

7. An alpha-olefin polymerization catalyst comprising at least one organoaluminum promoter and the catalyst component of any of claims 1–6.

8. An alpha-olefin polymerization catalyst comprising triethylaluminum or triisobutylaluminum and the catalyst component according to any of claims 1–6.

* * * * *

UNITED STATES PATENT OFFICE
CERTIFICATE OF CORRECTION

Patent No. 4,353,813               Dated Oct. 12, 1982

Inventor(s) Nicholas M. Karayannis and John S. Skryantz

It is certified that error appears in the above-identified patent and that said Letters Patent are hereby corrected as shown below:

Patent reads:

| Col. | Line | |
|---|---|---|
| 5 | 29 | "halogenzoic" should be --halobenzoic-- |
| 5 | 31/32 | "chlorosulfuric" should be --chlorosulfonic-- |
| 5 | 60 | "0.1:1" should be --0.01:1-- |
| 12 | 34 | "AL$(C_2H_5)_3$" should be --Al$(C_2H_5)_3$-- |
| 16 | 31 | "in applicable" should be --is applicable-- |

Signed and Sealed this

Fourth Day of October 1983

[SEAL]

Attest:

GERALD J. MOSSINGHOFF

Attesting Officer      Commissioner of Patents and Trademarks